United States Patent Office 2,974,371
Patented Mar. 14, 1961

2,974,371
METHOD OF EXTRUDING MATERIAL WHICH IS ADVERSELY AFFECTED BY HEAT

Edgar N. Meakin, 372 Roblar Ave., Hillsborough, Calif.

No Drawing. Filed May 31, 1955, Ser. No. 512,299

6 Claims. (Cl. 18—55)

My invention relates to the extrusion of material and more particularly to material which is adversely affected by heat.

Extrusion involves the forcing of material through the holes of a die under considerable pressure. The material emerges in string form, from which pellets may be formed if desired, by severing or fracturing the material as it is thus extruded.

During extrusion of material, under the conditions noted, considerable heat is developed. Some materials give no trouble when exposed to such heat, even under the existing pressures which simultaneously prevail, and which have given rise to the heat in question. Other materials, however, such as antibiotics, vitamins, and many of the nutritional elements, undergo deterioration chemically, while others such as sawdust and many plastics are adversely affected physically when exposed to the heat of extrusion.

The employment of refrigeration equipment in conjunction with the extrusion apparatus, to maintain the extrusion chamber and its contents cool, has proven too costly by reason of the fact that most of the materials which are extruded, are of low heat conductivity and consequently the refrigerating equipment must be of considerable capacity, thus rendering it large and bulky.

One solution of the problem has been the development of a refrigerated die such as that which forms the subject matter of my co-pending application for Pellet Mill Die, Serial No. 365,874 of July 3, 1953, and now P.N. 2,759,219. In accordance with this solution to the problem, heat of extrusion is withdrawn as it develops, whereby the temperature of the material under extrusion is held within a safe range.

In accordance with the present invention, the material itself is precooled to a temperature sufficient to maintain the material within a safe temperature range during extrusion thereof. This I have accomplished in an exceedingly simple and effective manner through the introduction into the material, of a refrigerant, prior to the extrusion of the material, and then extruding the material while in its resulting refrigerated condition.

A refrigerant which lends itself very admirably to the carrying out of this method is a gaseous refrigerant in its solid state, a well known example of which would be carbon dioxide, otherwise known as Dry Ice, snice it passes directly from its solid state to a gaseous state and consequently does not noticeably alter the moisture or chemical composition of the material under extrusion.

Mixing of the Dry Ice with the material to be extruded, puts it into intimate contact with the particles of such material, and therefore, despite the low heat conductivity of the material, such inimate contact causes the temperature drop in the material to be rapid and effective.

From the foregoing, it will be apparent that the significance of the method of the present invention resides in the fact that at practically no cost except the relatively litle involved in the cost of the Dry Ice, and with very little added time and labor, materials which heretofore could not be extruded satisfactorily without resort to cumbersome and costly equipment, can now be satisfactorily extruded and pelleted.

While I have disclosed my invention in its preferred form and in considerable detail, the same is subject to some alteration and modification without departing from the underlying principles involved, and I accordingly do not desire to be limited in my protection to the specific details involved except as may be necessitated by the appended claims.

I claim:

1. The method of extruding material which is adversely affected by heat, comprising precooling such material to a temperature sufficient to maintain the same within a safe temperature range during extrusion thereof, and then extruding the said material while in such precooled condition.

2. The method of extruding material which is adversely affected by heat, comprising directly exposing such material to a refrigerant prior to extrusion of the material, and then extruding the said material while in its resulting refrigerated condition.

3. The method of extruding material which is adversely affected by heat, comprising mixing with such material, a refrigerant prior to extrusion of the material, and then extruding the material while in its resulting refrigerated condition.

4. The metod of extruding material which is adversely affected by heat, comprising mixing with such material, a gas refrigerant prior to extruding the material and then extruding the said material while in its resulting refrigerated condition.

5. The method of extruding material which is adversely affected by heat, comprising mixing with such material, a gas refrigerant in solid form and extruding the material while in its resulting refrigerated condition.

6. The method of extruding material which is adversely affected by heat, comprising mixing with such material, carbon dioxide in solid form, and extruding the said material while in its resulting refrigerated condition.

References Cited in the file of this patent

UNITED STATES PATENTS

| 1,776,366 | Novotny | Sept. 23, 1930 |
| 1,901,324 | Novotny | Mar. 14, 1933 |
| 2,167,441 | Wick | July 25, 1939 |
| 2,307,371 | Hileman | Jan. 5, 1943 |